Jan. 14, 1969 C. INFANTE 3,422,305

GEOMETRY AND FOCUS CORRECTING CIRCUIT

Filed Oct. 12, 1967

Sheet 1 of 2

CARLO INFANTE
INVENTOR

BY
BUCKHORN, BLORE, KLARQUIST & SPARKMAN
ATTORNEYS

CARLO INFANTE
INVENTOR
BY
BUCKHORN, BLORE, KLARQUIST & SPARKMAN
ATTORNEYS

3,422,305
GEOMETRY AND FOCUS CORRECTING CIRCUIT

Carlo Infante, Portland, Oreg., assignor to Tektronix, Inc., Beaverton, Oreg., a corporation of Oregon Filed Oct. 12, 1967, Ser. No. 674,887
U.S. Cl. 315—24 9 Claims
Int. Cl. H01j 29/56; H01j 29/58

ABSTRACT OF THE DISCLOSURE

A deflection circuit for a cathode ray tube develops correcting signals for application to the cathode ray tube's orthogonally related deflection means for the purpose of substantially reducing pincushion distortion in the resulting display. An electrical quantity proportional to the square of a first deflection signal is multiplied by a second deflection signal and the product is subtracted from such second deflection signal. Likewise, a correction signal proportional to the square of the second deflection signal is multiplied by the first deflection signal, and the product is subtracted from the first deflection signal. In the same circuit a quantity is developed which is proportional to the sum of the squares of the deflection signals for application to the cathode ray tube's focus electrode whereby cathode ray tube focus is properly maintained.

*Background of the invention*

In cathode ray tubes, and especially in the case of tubes employing wide angle deflection of an electron beam toward a relatively flat screen or target, the corners of the display or raster are likely to become distorted unless steps are taken to correct the situation. This distortion, called pinchushion distortion, arises from the fact that the tube's electron beam intercepts the screen at greater distances from the electron beam's source as the electron beam is deflected from the center of a relatively flat screen, with the corners of a rectangular display appearing misproportionately extended. One method of counteracting this distortion includes generation of auxiliary magnetic fields whereby an opposite or counter distortion is added to the display. However, a loss of resolution at the corners of the display has been encountered with this method. Another known system for reducing pincushion distortion utilizes resonant frequency circuitry wherein the deflection waveforms are shaped by selected circuit components to provide desired counter distortion. However, this system ordinarily requires the deflection waveforms to have a non-variable frequency rate in order for the circuitry to exert a uniformly corrective effect. Therefore, this type of correction is not readily adaptable to cathode ray tube systems including oscilloscopes and the like wherein sweep rate may be varied at will. Moreover, an additional type of distortion or lack of resolution encountered in the display of a cathode ray tube, especially in one employing wide angle deflection and a relatively flat screen, results from the defocusing of the tube's electron beam as such electron beam is deflected across the screen away from screen center. Although electronic circuitry has heretofore been proposed for dynamically counteracting pincushion distortion, in spite of changes in sweep rate and the like, the defocusing effect presents a hindrance to display clarity not alleviated heretofore by the same circuitry.

*Summary of the invention*

According to the present invention, an electronic deflection circuit for a cathode ray tube develops a first correction signal proportional to the value of a first deflection signal squared and multiplied by a second deflection signal. This correction signal is then subtracted from the second deflection signal as applied to the cathode ray tube's deflection means. Also, a second correction signal is developed which is proportional to the second deflection signal squared and multiplied by a first deflection signal. This latter correction value is subtracted from the first deflection signal as applied to the cathode ray tube's deflection means. As a result of the subtraction of the correction signal values, pincushion distortion is substantially eliminated. Furthermore, the squares of the first deflection signal and the second deflection signal, as developed for the pincushion correction, are also added together and applied to the cathode ray tube's focus electrode, acting to retain the proper electron beam focus as the tube's electron beam is deflected away from the center of the display.

It is accordingly an object of the present invention to provide an improved and simplified deflection circuit for a cathode ray tube for enabling the cathode ray tube to present a display with greater clarity and less distortion.

It is another object of the present invention to provide an improved and simplified circuit for correcting pincushion distortion in a cathode ray tube display while at the same time providing corrective focusing for the tube's electron beam.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference numerals refer to like elements.

*Drawings*

*Detailed description*

Figures 1, 2:
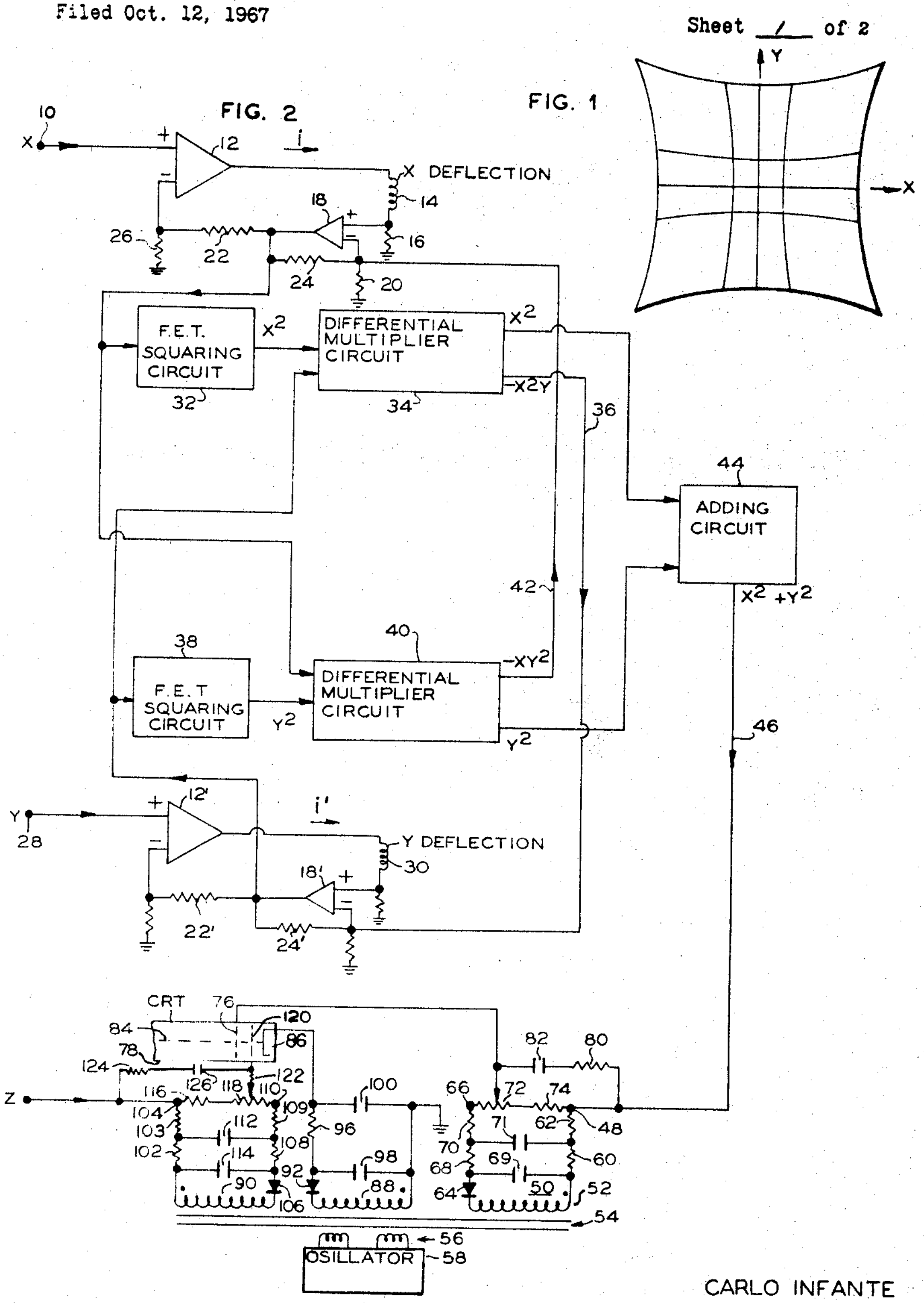
FIG. 1 is a representation of a cathode ray tube display raster as affected by pincushion distortion.
FIG. 2 is a block diagram of a geometry and focus correcting circuit according to the present invention.

In FIG. 1, a display raster for a cathode ray tube which is affected by pincushion distortion is illustrated. As can be seen, traces which are intended, in accordance with input information, to be substantially horizontal and vertical, tend instead to be bowed away from the center of the display as the electron beam producing the display is deflected in two coordinate directions away from the display center. As previously mentioned, a principal cause of this distortion is the relative flatness of the cathode ray tube screen, whereby the screen intercept of an electron beam deflected a given amount in the Y direction, for example, will be shifted further in the Y direction as deflection in the X direction also takes place. In a magnetically deflected, flat-faced cathode ray tube, it can be shown that the deflection $D_x$ and $D_y$ due to currents $i_x$ and $i_y$ flowing in the deflection yoke are, to a good approximation, given as follows:

$$D_x=\frac{dki_x}{\sqrt{(1-k^2i_x^2)(1-h^2i_y^2)}}$$

$$D_y=\frac{dhi_y}{\sqrt{(1-k^2i_x^2)(1-h^2i_y^2)}}$$

where $d$ is the distance from the center of deflection to the cathode ray screen, and $h$ and $k$ are constants related to deflection sensitivity. These expressions describe a cathode ray tube display exhibiting pincushion distortion, for example, as illustrated in FIG. 1.

It can also be shown that in order to correct this geometry distortion, to a first order approximation, one should alter the input X and Y deflection signals by subtracting values therefrom proportional to $XY^2$ and $X^2Y$, respectively. The circuit of FIG. 2 develops these values for achieving the desired correction. Referring to FIG. 2, an X deflection signal is applied to terminal 10. Terminal 10 is connected to a positive input of differential feedback amplifier 12, the output of which is coupled to a first terminal of X deflection coil 14, the latter forming a part of the cathode ray tube's magnetic deflection yoke. Amplifier 12 is a high gain, D.C. coupled amplifier having positive and negative inputs. Amplifier 12 provides an output directly proportional to its positive input but inversely proportional to its negative input. The remaining terminal of the X deflection coil is returned to a point of reference potential through an impedance, here comprising a resistor 16.

The junction between coil 14 and resistance 16 is coupled to a positive input terminal of a second differential feedback amplifier 18 similar to amplifier 12. The negative input terminal of amplifier 18 is returned to a point of reference potential through resistor 20. The output of amplifier 18 is coupled to the negative input terminal of amplifier 12 through resistor 22 in order to complete a negative feedback loop for amplifier 12, while feedback resistor 24 connects the output of amplifier 18 to its negative input terminal whereby to provide a negative feedback loop for amplifier 18. Resistor 26 returns the negative input terminal of amplifier 12 to a point of reference potential.

The Y deflection input signal 28 is similarly connected to Y deflection coil 30 through a substantially similar circuit to that described above wherein like components are referred to by primed reference numerals. The operation of the Y deflection circuit is also substantially the same as that of the X deflection circuit.

Referring to the operation of circuitry as thus far described, amplifier 12 provides a current, *i*, through X deflection coil 14 in response to the changing X deflection signal applied at terminal 10. Amplifier 18 and resistor 22 form, in conjunction with coil 14, the negative feedback circuit for amplifier 12 whereby the difference between the positive and negative inputs of amplifier 12 is reduced to a small value. The circuit operates such that if the X deflection signal at terminal 10 increases, the current, *i*, through the coil increases until the negative voltage at the negative input terminal of amplifier 12 changes to substantially match the change applied to terminal 10. The voltage applied at the negative input of amplifier 12 is supplied from amplifier 18 which derives its voltage input from across resistor 16, the latter voltage input being proportional to the current, *i*, in X deflection coil 14. Since the voltage applied to the negative input terminal of amplifier 12 and the current, *i*, through X deflection coil 14 are directly proportional, then the current through the coil will be constrained to become a substantially linear function of X. Thus the feedback circuit for amplifier 12, including amplifier 18, is effective to linearize the current change in the deflection coil in response to changes in applied deflection voltage, it being understood that the current in such coil would not be directly proportional to a voltage merely applied thereacross because of the coil's inductive reactance.

Referring further to the circuit of FIG. 2, correction circuitry for reducing or substantially eliminating pincushion distortion includes a squaring circuit 32 receiving, as its input, the output of amplifier 18. The output of amplifier 18 is constrained to the value, X, of the X deflection signal as hereinbefore described, and therefore the output of amplifier 18 is proportional to the X deflection signal. The output circuit of amplifier 18 is a lower impedance point, and the amplifier provides adequate drive for squaring circuit 32.

The squaring circuit 32 employs the squaring properties of a field-effect transistor, as hereinafter more fully described, to provide an output substantially proportional to $X^2$, and the latter is applied as an input to differential multiplier circuit 34. Differential multiplier circuit 34 receives a second input from the output of differential feedback amplifier 18', proportional to Y, and multiples $X^2$ by Y, providing the negative value of the product on lead 36. Lead 36 is in turn connected to the negative input of differential feedback amplifier 18'. In this manner the correction signal $-X^2Y$ is added to the deflection signal to which current of *i'* in Y deflection coil 30 is proportional. In a general sense, it will be seen that since the correction value $-X^2Y$ is provided at the negative input terminal of amplifier 18', and since amplifier 18' drives the negative input terminal of amplifier 12', then the current *i'* will be altered in a negative direction by the correction value. That is, a quantity $X^2Y$ is subtracted from the deflection current. Viewed in another way, the correction value, $-X^2Y$, provides a portion of the negative or bucking input to amplifier 18' which would otherwise be supplied through feedback resistor 24'. As a result, the current, *i'*, differs from being proportional to the input deflection signal in proportion to the quantity $-X^2Y$.

The X deflection current, *i*, in coil 14 is similarly altered by means of a correction circuit comprising a squaring circuit 38 receiving as its input a value proportional to the value of Y appearing at the output of amplifier 18'. Again, the squaring circuit 38 employs a field-effect transistor, as hereinafter more fully described, and generates an output proportional to $Y^2$, which output in turn is applied as an input to differential multiplier circuit 40. Differential multiplier circuit 40 also receives an input proportional to X from the output of amplifier 18, and produces a negative product, $-XY^2$, on lead 42. Lead 42 connects this correction value to the negative input of amplifier 18 whereby to alter the current, *i*, in the X deflection coil in accordance therewith.

The values of $X^2$ and $Y^2$, as generated above in the pincushion correction circuitry, are provided as inputs to an adder or adding circuit 44. As will hereinafter be more fully described, the values of $X^2$ and $Y^2$ are most satisfactorily obtained from the differential multiplier circuit in a manner eliminating unwanted D.C. levels. The adding circuit 44 provides an output, $X^2+Y^2$, on line 46 for application to a terminal 48 of a floating power supply 50. This floating power supply includes a winding 52 inductively related to other windings on a power supply transformer 54, such transformer also including output and feedback windings 56 of an oscillator 58. One end of the winding 52 is coupled to terminal 48 through resistors 60 and 62 while the remaining end of winding 52 is connected to the cathode of diode rectifier 64. The anode of rectifier 64 is coupled to power supply terminal 66 through resistors 68 and 70. Filter capacitors 69 and 71 join respective ends of resistors 60 and 68. A voltage divider comprising potentiometer 72 and resistor 74, in that order, is disposed between terminal 66 and terminal 48, while the movable tap of potentiometer 72 is connected to the focus electrode 76 of cathode ray tube 78, for which coils 14 and 30 comprise the deflection yoke. A speed-up circuit comprising resistor 80 and capacitor 82 in series is connected between terminal 48 and the movable tap of potentiometer 72.

Floating power supply 50 acts to provide a relatively high negative potential at focus electrode 76 of the cathode ray tube commensurate with the customarily high voltage level at which this electrode is required to operate. The winding 52 has a large number of turns compared with the windings 56 of oscillator 58, and therefore steps up the oscillator output to a large A.C. value. Rectifier 64 rectifies such value whereby a high negative voltage is supplied at terminal 66 relative to terminal 48. This negative voltage is filtered employing filter capacitors 69 and 71 and the resistors coupled in series between the winding and the output terminals 66 and 48.

The movable tap of potentiometer 72 may be adjusted to select the correct focusing potential for electrode 76 such that the electron beam 84 produced at cathode 86 will be correctly focused at the center of the cathode ray tube screen. Then, as the electron beam is deflected away from the center of the screen, the distance it travels in order to reach the screen changes, and therefore, in order to maintain good focus length of the electrostatic lens inside the cathode ray tube is desirably changed. It can be shown that a good first order correction is obtained when a waveform is applied to the focus electrode proportional to $X^2+Y^2$. Thus, terminal 48 of the power supply, instead of being returned directly to ground, is instead connected to line 46 providing the desired correction signal. As deflection takes place away from the center of the tube, the suitable amount of correction is applied to the focus electrode 76 because the voltage level of the entire floating power supply 50 is elevated by the amount of $X^2+Y^2$, so that the spot provided by electron beam 84 at the screen of the cathode ray tube remains substantially in proper focus.

Transformer 54 is similarly provided with a winding 88 and a winding 90 which also have a relatively large number of turns so that high voltages are induced therein. A diode rectifier 92 is connected in series with winding 88, the rectifier's cathode being connected to a first terminal of winding 88, while the remaining winding terminal is suitably grounded. A resistor 96 is interposed between the anode of rectifier 92 and cathode 86 of cathode ray tube 78 while capacitors 98 and 100 are connected between either side of resistor 96 and ground to provide filtering action. As a consequence of the operation of this circuit, a proper high negative voltage is provided at CRT cathode 86.

One end of winding 90 is coupled through resistor 102 and resistor 103 in series to terminal 104 while the opposite end of winding 90 is coupled through negatively poled diode 106, and through resistors 108 and 109 in series to terminal 10. Filter capacitors 112 and 114 are connected between respective ends of resistors 102 and 108. A voltage divider comprising resistor 116 and potentiometer 118 is connected between terminals 104 and 110, and the movable tap of potentiometer 118 is coupled to cathode ray tube grid 120 through resistor 122. A "Z" signal, for example an unblanking signal, may be applied to terminal 104 whereby the voltage of grid 120 may be selectively changed from a potential inhibiting emission of electron beam 84 to a potential permitting emission thereof. It is observed that the circuit including winding 90 and capacitor 106 comprises a floating power supply taking "Z" as a reference rather than ground. A speed-up circuit comprising the series combination of resistor 124 and capacitor 126 is suitably interposed between terminal 104 and grid 120, grid 120 being separated from the remainder of the power supply by resistor 122. Resistor 122 is made sufficiently large so that the charge on capacitor 126 will not change materially during the brief period necessary to drive the floating supply to its more positive condition at the start of an unblanking pulse. Power supply means of this type is set forth and claimed in the patent of John R. Kobbe, 2,804,571, issued Aug. 27, 1957, and assigned to the assignee of the present invention.

Figure 3:
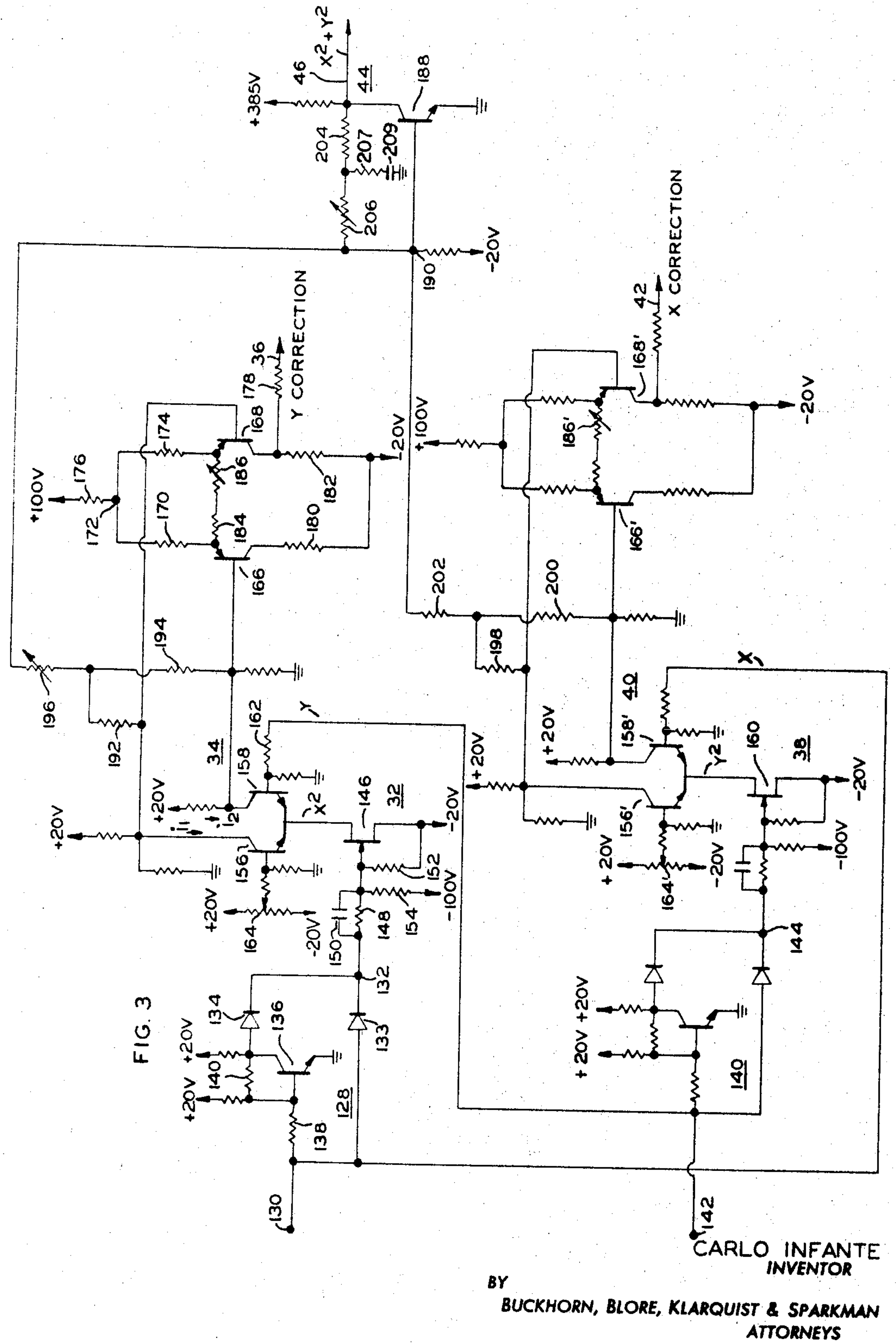
FIG. 3 is a schematic diagram of a principal portion of the FIG. 2 circuit.

FIG. 3 is a schematic diagram of a specific embodiment of portions of the present invention hereinbefore illustrated in block form in FIG. 2. Referring to FIG. 3, a first amplifier 128 receives a value proportional to the X deflection signal on terminal 130, from the output of amplifier 18 in FIG. 1, and develops an output at 132 proportional to the absolute value of the X deflection signal. A first diode 133 is connected between terminal 130 and terminal point 132 while a second similarly poled diode 134 is disposed between the collector of a transistor 136 and terminal 132. Transistor 136 also receives the input from terminal 130 on its base electrode, through resistor 138, and is provided with feedback through resistor 140, substantially equal in resistance to resistor 138, so that transistor 136 provides inversion and unity gain. Therefore, an output proportional to the absolute value of X is supplied at terminal 132. Amplifier 141 similarly receives an input at terminal 142 proportional to the Y deflection signal, from the output of amplifier 18' in FIG. 2, and supplies the absolute value thereof at point 144. The operation of amplifier 141 is substantially the same as that of amplifier 128.

Point 132 is coupled to the gate electrode of field-effect transistor 146 through a resistor 148 and a speed-up capacitor 150 shunted thereacross. The gate electrode of transistor 146 is also connected to the midpoint of the voltage divider comprising resistors 152 and 154, here disposed between −20 and −100 volts, for setting the proper voltage level for such gate electrode. The source terminal of the transistor is similarly returned to −20 volts while the drain terminal is connected to the common reference terminals of a pair of differentially connected control devices or amplifying devices, here comprising common emitter terminals of transistors 156 and 158.

Field effect transistor 146 comprises a principal element of squaring circuit designated by reference numeral 32 in FIG. 2. Many field-effect transistors have a square-law transfer characteristic and therefore can provide a drain current proportional to the square of the input voltage at terminal 132. In the case of transistor 146, this output is substantially proportional to $X^2$. A similar field-effect transistor 160 comprises the principal element of squaring circuit 38 reeciving its input at point 144 and providing an output proportional to $Y^2$ at the drain electrode of transistor 160.

Transistors 156 and 158 comprise the principal elements of a differential amplifier multiplier circuit, 34, receiving the value proportional to $X^2$ at the common emitter terminals of transistors 156 and 158, as indicated, and also receiving a voltage proportional to the Y deflection signal, applied at the base of transistor 158 through resistor 162 from terminal 142. The base of transistor 156 is coupled to the movable tap of potentiometer 164 disposed between predetermined voltage levels, and comprises a vertical balance geometry control as hereinafter more fully described. If $i_1$ is the collector current for transistor 156, and $i_2$ is the collector current of transistor 158, it can be shown to a good approximation that:

$$i_1=\frac{FX^2}{2}+\frac{GX^2Y}{4V_o}$$

and $$i_2=\frac{FX^2}{2}-\frac{GX^2Y}{4V_v}$$

where $V_o=kT/q$, $k$=Boltzmann's constant, T=the absolute temperature of the transistor, $q$=the charge of an electron, and F and G are constants.

The collectors of transistors 156 and 158 are connected to the input terminals of a differential amplifier comprising transistors 166 and 168. Specifically, the collectors of transistors 156 and 158 are connected to the respective bases of transistors 166 and 168. The emitters of transistors 166 and 168 are coupled together by a network comprising resistor 170 interposed between the emitter of transistor 166 and point 172, as well as a resistor 174 interposed between the emitter of transistor 168 and point 172. A resistor 176, substantially larger in value than resistors 170 or 174, is connected between point 172 and a point of positive potential as illustrated. Alternatively, the emitter-collector path of the transistor, in series with a resistance, may be substituted for resistor 176, the base electrode of such a transistor being connected to a predetermined voltage level. The emitters of transistors 166 and 168 are interconnected by the series combination of resistor 184 and variable resistor 186, variable resistor 186 being a vertical geometry control as hereinafter more fully described. The collectors of transistors 166 and 168 are suitably provided with load resistors interposed between such collectors and a source of negative potential.

The circuit including transistors 166 and 168 operates as a differential amplifier such that similar input signals applied at the bases of transistors 166 and 168 have an opposite effect on the output of such amplifier, here derived at the collector of transistor 168 through resistor 18. The output is proportional to $i_1-i_2$, or the difference of the currents flowing in the load resistors of transistors 156 and 158. Therefore, the output of such differential amplifier, comprising transistors 166 and 168, is equal to $-HX^2Y$, where H is a constant. This output is suitably applied to lead 36 which connects to the negative input of amplifier 18' in FIG. 2. It will be seen that this correction signal, as derived at the collector of transistor 168, is negative in sign since it varies inversely with the Y proportional input received at terminal 142.

The circuit including transistors 156, 158, 166, and 168 comprises the differential multiplier circuit also indicated at 34 in FIG. 2. Similarly, the circuit including the transistors 156', 158', 166', and 168' comprises the differential multiplier circuit 40 of FIG. 2, the operation of the latter circuit being substantially similar to that described for circuit 34. Differential multiplier circuit 40 provides an X correction signal proportional to $-XY^2$ on lead 42 for application to the negative input of amplifier 18 in FIG. 2.

An adding circuit 44, as similarly designated in FIGS. 2 and 3, receives $X^2$ and $Y^2$ inputs and produces an $X^2+Y^2$ output. Referring particularly to FIG. 3, this circuit suitably includes a transistor 188 receiving a pair of inputs at input terminal 190 thereof, the latter being connected to the base of the transistor. A first input is derived from a coupling network comprising resistors 192 and 194 connected in voltage divider fashion between the collectors of transistors 156 and 158. The midpoint of such voltage divider is coupled to terminal 190 by way of adding resistor 196, which takes the form of a focus correction symmetry control as hereinafter more fully described. A second input for the adding circuit is derived from a second coupling network comprising resistors 198 and 200 connected in voltage divider fashion between the collectors of transistors 156' and 158'. The midpoint of the voltage divider comprising resistors 198 and 200 is coupled to terminal 190 by means of an adding resistor 202. The voltage at the junction of resistors 192 and 194 is proportional to $X^2$, while unwanted D.C. voltages are balanced out. Similarly, the voltage at the midpoint between resistors 198 and 200 is proportional to $Y^2$ alone.

The adding circuit 44 further employs a transistor 188 connected as an operational amplifier, having a feedback path including resistor 204 and variable resistor 206, in series, between the collector of transistor 188 and input terminal 190. A series connection of resistor 207 and capacitor 209 between the midpoint of resistors 204 and 206, and a point of reference potential, provides phase correction for preventing amplifier oscillation. This type of circuit operates in a well known manner whereby the output at the collector of transistor 188 is proportional to the sum of the voltages derived at the midpoints of voltage divider 192–194 and voltage divider 198–200 and applied to the base of transistor 188 through adding resistors 196 and 202. Thus, the output applied on line 46 is proportional to $X^2+Y^2$. Line 46 is connected to terminal 48 of floating power supply 50 as indicated in FIG. 2.

The vertical geometry balance potentiometer 164 is adjusted to provide the same pincushion distortion compensation at both the top and bottom of the presentation or display of the cathode ray tube. In the specific circuit including transistors 156 and 158, this adjustment compensates for any differences in D.C. potential between the bases of transistors 156 and 158. Similarly, potentiometer 164' in the circuit including transistors 156' and 158' may be described as a horizontal geometry balance control used for making any needed adjustment to insure that pincushion distortion compensation on both the left and right hand portions of the cathode ray tube display is the same.

In the circuit including transistors 166 and 168, variable resistor 186 is a gain control whereby the amount of pincushion distortion compensation may be changed. The connection, including resistor 184 and variable resistor 186 between the emitters of transistors 166 and 168, as well as resistors 170 and 174 connected to resistor 176, acts to stabilize the gain of the circuit against possible changes in transistor characteristics and the like. Similarly, variable resistor 186' is employed for adjusting the amplitude of the X correction signal applied on lead 42. Variable feedback resistor 206 in adding circuit 44 is employed to adjust the overall focus correction signal amplitude so that the cathode ray tube display will be properly maintained in focus during deflection of the electron beam.

While I have shown and described preferred embodiments of my invention, it will be apparent to those skilled in the art that many changes and modifications may be made without departing from my invention in its broader aspects. For example, the geometry and focus correcting circuit according to the present invention is illustrated in connection with magnetic deflection means, and is principally useful therewith because of the distortion frequently encountered with wide angle magnetic deflection. However, the circuitry according to the present invention may also be employed in connection with electrostatic deflection means. Similarly, the present invention could be easily adapted to magnetically focussed cathode ray tubes. I therefore intend the appended claims to cover all changes and modifications as fall within the true spirit and scope of my invention.

I claim:

1. A deflection circuit for a cathode ray tube wherein said cathode ray tube is provided with horizontal and vertical deflection means and a focus electrode, said circuit comprising:
- first and second terminals for receiving a horizontal deflection signal and a vertical deflection signal, respectively,
- first and second squaring means for respectively providing electrical quantities proportional to the squares of said deflection signals,
- means for receiving said electrical quantities from said first and second squaring means and providing correction signals in proportion thereto for application respectively to said vertical and horizontal deflection means of said cathode ray tube in conjunction with said horizontal and vertical deflection signals received on said first and second terminals for correcting pincushion distortion in the display of said cathode ray tube,
- adding means for producing an electrical quantity proportional to the sum of the squares of said deflection signals,
- and means for applying the output of said adder means to said focus electrode of said cathode ray tube.

2. A deflection circuit for a cathode ray tube wherein said cathode ray tube is provided with a focus electrode and horizontal and vertical deflection means adapted for deflecting the cathode ray tube's electron beam substantially in response to horizontal and vertical deflection signals, said circuit comprising:
- first and second terminals for receiving horizontal and vertical deflection signals respectively,
- first and second squaring means for providing electrical quantities proportional to the square of each of said deflection signals,
- a first correction circuit for receiving the electrical quantity proportional to the square of said horizontal deflection signal and responsive to such square of said horizontal deflection signal for developing a pincushion distortion correction value for application to the vertical deflection means of said cathode ray tube, second correction circuit means for receiving the electrical quantity proportional to the square of said vertical deflection signal and responsive to such square of said vertical deflection signal for developing a pincushion distortion correction value for application to the horizontal deflection means of said cathode ray tube, adder means for producing an output proportional to the sum of said electrical quantities respectively proportional to the square of the horizontal deflection signal and the square of the vertical deflection signal, and means for applying such output to the focus electrode of said cathode ray tube.

3. The circuit according to claim 2 wherein each said squaring means includes a circuit for developing the absolute value of a deflection signal, and a field-effect transistor receiving such absolute value at its gate electrode for producing an output signal proportional to the square thereof.

4. The circuit according to claim 2 wherein each of said correction circuits includes a differential amplifier circuit comprising a pair of control devices having common reference electrodes coupled together to receive a said electrical quantity proportional to the square of a deflection value, and having a coupling network connected to both the output electrodes of said control devices of said pair for supplying an input for said adder means proportional to the square of a deflection signal.

5. The circuit according to claim 4 wherein a said control device of said first correction circuit includes an input terminal coupled to receive a value proportional to said vertical deflection signal, said correction circuit acting to produce a correction value proportional to the product of said vertical deflection signal and the square of said horizontal deflection signal.

6. The apparatus according to claim 2 wherein said means for applying said output of said adder means to the focus electrode of said cathode ray tube comprises:

a floating high voltage power supply for raising said focus electrode to a relatively high negative voltage, said power supply including a power supply transformer provided with a winding thereon having a first terminal coupled to said focus electrode and having a second terminal coupled to receive the output of said adder means, and rectifier connected in series with said winding poled to provide a negative voltage at said focus electrode with respect to the output of said adder means.

7. A deflection circuit for a cathode ray tube including horizontal and vertical deflection means adapted for producing horizontal and vertical deflection of the electron beam thereof, and having a focus electrode, said circuit comprising:

first and second terminals for receiving a horizontal deflection signal and a vertical deflection signal adapted for application respectively to said horizontal and vertical deflection means, first and second squaring means for providing electrical quantities proportional to the square of said horizontal deflection signal and the square of said vertical deflection signal, respectively, first multiplier means for receiving a value proportional to the horizontal deflection signal and said electrical quantity supplied by said second squaring means, and for producing therefrom an electrical quantity substantially proportional to the product of such horizontal deflection signal and the square of the vertical deflection signal, means for modifying the horizontal deflection signal applied to the horizontal deflection means of said cathode ray tube including means for subtracting the electrical quantity supplied by said first multiplier means from said horizontal deflection signal before application thereof to said horizontal deflection means, second multiplier means for receiving a value proportional to the vertical deflection signal and said electrical quantity supplied by said first squaring means, and for producing therefrom an electrical quantity substantially proportional to the product of such vertical deflection signal and the square of the horizontal deflection signal, means for modifying the vertical deflection signal applied to the vertical deflection means of said cathode ray tube including means for subtracting the electrical quantity supplied by said second multiplier means from said vertical deflection signal before application thereof to said vertical deflection means, adder means for producing an output proportional to the sum of said electrical quantities respectively proportional to the square of the horizontal deflection signal and the square of the vertical deflection signal, and means for applying said output of said adder means to the focus electrode of said cathode ray tube.

8. A deflection circuit for a cathode ray tube including a focus electrode and first and second deflection means, said circuit comprising:

first and second input terminals for receiving first and second deflection input signals for application to said first and second deflection means, first and second amplifiers for respectively developing absolute values of said deflection signals, first and second field effect transistors each coupled to receive such an absolute value for providing an output proportional to the square thereof, first and second pairs of differentitally connected amplifying devices, each pair having a common reference terminal for receiving a respective one of said squared values, said pairs also having input terminals for receiving said second and first deflection input signals respectively, first and second differential amplifiers receiving as inputs thereof the outputs from output electrodes of respective pairs of said differentially connected amplifying devices, means for adding an output from said differential amplifiers to the deflection signals received on said first and second terminals in a manner such that the output of the first differential amplifier is added to the deflection input received on said second input terminal in a sense for reducing distortion thereof, while the output of the second differential amplifier is added to the deflection input received on said first input terminal in a sense for reducing distortion thereof, adder means having a pair of input connections wherein a first of said input connections is coupled from output terminals of said first pair of differentially connected amplifying devices and wherein the second input connection is coupled from output terminals of said second pair of differentially connected amplifying devices, said adder means providing an output proportional to the sum of the inputs received at its input connections, power supply means for said cathode ray tube including a transformer having a winding, one terminal of which is coupled to said focus electrode, and means connecting the output of said adder means to the remaining terminal of said winding.

9. The circuit according to claim 8 wherein said deflection means comprise orthogonally related magnetic deflection means, and further including circuitry for each deflection means comprising a first feedback amplifier receiving a deflection input signal from one of said input terminals and providing an output connected to one terminal of a said magnetic deflection means, impedance means coupling a second terminal of said magnetic deflection means to a point of reference potential, and a second feedback amplifier having an input terminal coupled to said second terminal of said magnetic deflection means, the output of said second feedback amplifier being connected to an input of said first feedback amplifier for completing a negative feedback path therefor, said means for adding an output from a differential amplifier to a deflection signal comprising means coupling the output of such differential amplifier as a negative input to said second feedback amplifier.

No references cited.

RODNEY D. BENNETT, *Primary Examiner.*

J. G. BAXTER, *Assistant Examiner.*

U.S. Cl. X.R.

315—27, 31

UNITED STATES PATENT OFFICE

CERTIFICATE OF CORRECTION

Patent No. 3,422,305 January 14, 1969

Carlo Infante

It is certified that error appears in the above identified patent and that said Letters Patent are hereby corrected as shown below:

Column 5, line 7, after "focus" insert -- , the focal --; line 38, "10" should read -- 110 --. Column 6, lines 51 and 52, "$4V_v$" should read -- $4V_o$ --. Column 7, line 8, "18" should read -- 178 --.

Signed and sealed this 17th day of March 1970.

(SEAL)
Attest:

Edward M. Fletcher, Jr.
Attesting Officer

WILLIAM E. SCHUYLER, JR.
Commissioner of Patents